(12) United States Patent
Raffaele et al.

(10) Patent No.: US 8,275,791 B2
(45) Date of Patent: Sep. 25, 2012

(54) PROCESS FOR EXECUTING A DOWNLOADABLE SERVICE RECEIVING RESTRICTIVE ACCESS RIGHTS TO AT LEAST ONE PROFILE FILE

(75) Inventors: Eric Raffaele, Toulouse (FR); Gavin Brebner, St. Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 2223 days.

(21) Appl. No.: 10/616,582

(22) Filed: Jul. 9, 2003

(65) Prior Publication Data

US 2004/0025060 A1 Feb. 5, 2004

Related U.S. Application Data

(62) Division of application No. 10/077,595, filed on Feb. 15, 2002, now Pat. No. 6,757,685.

(30) Foreign Application Priority Data

Feb. 19, 2001 (EP) .................................. 01410021

(51) Int. Cl.
*G06F 17/30* (2006.01)
(52) U.S. Cl. ......... 707/784; 707/782; 707/783; 707/822
(58) Field of Classification Search .................. 707/10, 707/8, 104, 9, 104.1, 782, 783, 784, 822; 709/248, 217
See application file for complete search history.

(56) References Cited

U.S. PATENT DOCUMENTS

| 5,870,544 A | 2/1999 | Curtis ..................... 395/187.01 |
| 5,877,759 A | 3/1999 | Bauer .......................... 345/339 |
| 5,974,549 A | 10/1999 | Golan .......................... 713/200 |
| 5,978,802 A * | 11/1999 | Hurvig ............................. 707/8 |
| 6,018,724 A * | 1/2000 | Arent .............................. 705/44 |
| 6,038,551 A * | 3/2000 | Barlow et al. ................... 705/41 |
| 6,058,482 A | 5/2000 | Liu .............................. 713/201 |
| 6,070,239 A | 5/2000 | McManis ...................... 713/187 |
| 6,076,166 A | 6/2000 | Moshfeghi et al. ........... 713/201 |

(Continued)

FOREIGN PATENT DOCUMENTS

EP 1 118 949 A1 7/2001

(Continued)

OTHER PUBLICATIONS

Gong, L., "Java Security Architecture (JDK 1.2) Version 1.0," located at Internet address: <http://java.sun.com/people/gong/papers/jdk12spec.pdf>, pp. 1-62 (Dec. 6, 1998).

(Continued)

*Primary Examiner* — Dangelino Gortayo

(57) ABSTRACT

A process for executing a downloadable service with specific access rights to at least one profile file in a user's computer. The web browser is used for accessing a web server through a first set of communication port and socket. Therefore is arranged a confined runtime environment such as for example an extended sandbox (11) and used in Java programming which is assigned a second communication port and sockets and which is used for executing downloadable service with restricted access on at least one profile file. The process can be used for executing services under the form of a signed archive file which signature is used for both validating the archive file and for selecting one particular secure class loader prior to the generation of the compiled code of the service.

5 Claims, 4 Drawing Sheets

U.S. PATENT DOCUMENTS

| | | | |
|---|---|---|---|
| 6,088,805 A * | 7/2000 | Davis et al. | 726/10 |
| 6,473,800 B1 * | 10/2002 | Jerger et al. | 709/226 |
| 6,542,908 B1 * | 4/2003 | Ims | 707/204 |
| 6,708,221 B1 * | 3/2004 | Mendez et al. | 709/248 |
| 6,854,016 B1 * | 2/2005 | Kraenzel et al. | 709/229 |
| 6,944,650 B1 * | 9/2005 | Urien | 709/217 |
| 7,107,536 B1 * | 9/2006 | Dowling | 715/738 |
| 7,206,844 B2 * | 4/2007 | Gupta et al. | 709/226 |
| 7,305,703 B2 * | 12/2007 | Elgressy et al. | 726/13 |
| 2001/0045451 A1 * | 11/2001 | Tan et al. | 235/375 |

FOREIGN PATENT DOCUMENTS

| | | |
|---|---|---|
| WO | 98/43146 | 10/1998 |
| WO | 98/47250 | 10/1998 |
| WO | 99/16003 | 4/1999 |

OTHER PUBLICATIONS

Koved, L., et al., "The Evolution of Java Security," *IBM System Journal*, vol. 37, No. 3, pp. 1-14 (1998).

Venners, B., "Security and the class loader architecture," JavaWorld IDG Communications, located at Internet address: <http://www.javaworld.com/javaworld/jw-09-1997/jw-09-hood_p.html>, pp. 1-7 (Sep. 1997).

Rubin, A.D., et al., "Mobile Code Security," *Internet Computing, IEEE*, vol. 2, Issue 6, pp. 30-34 (Nov./Dec. 1998).

* cited by examiner

PROCESS FOR EXECUTING A DOWNLOADABLE SERVICE RECEIVING RESTRICTIVE ACCESS RIGHTS TO AT LEAST ONE PROFILE FILE

CROSS-REFERENCE TO RELATED APPLICATION

This application claims priority to and is a divisional of U.S. patent application Ser. No. 10/077,595, filed on Feb. 15, 2002, and entitled "PROCESS FOR EXECUTING A DOWNLOADABLE SERVICE RECEIVING RESTRICTIVE ACCESS RIGHTS TO AT LEAST ONE PROFILE FILE," which claims priority to European Patent Application No. 01410021.8, filed on Feb. 19, 2001, and entitled "PROCESS FOR EXECUTING A DOWNLOADABLE SERVICE RECEIVING RESTRICTIVE ACCESS RIGHTS TO AT LEAST ONE PROFILE FILE".

TECHNICAL FIELD OF THE INVENTION

The invention relates to communication systems and more particularly to a process for executing a downloadable service receiving restrictive access rights to at least one profile file.

BACKGROUND ART

The constant progress of the Information Handling System (I.H.S.) technology and that of the communication systems, particularly with the explosion of the Internet and intranet networks, have resulted in the development of an era of information and services. With a single personal device, a user can get a connection to the Internet network, and have direct access to a wide range of information and services, including electronic business applications.

Solutions were developed in the art for rendering easier the access to these huge amounts of resources and for improving the possibilities of negotiation and new services. For this purpose, agents were developed for allowing the customers to delegate some specific tasks to automatic modules in order to simplify part of the searching process.

U.S. Pat. No. 5,877,759 assigned to Netscape Communications Corp. and entitled Interface for user/agent interaction shows a first example of a user interface which provides assistance to the client user and an interface that is centered on autonomous processing of whole tasks rather than sequences of commands.

International application number WO 98/47250 assigned to IBM Corp. and entitled Apparatus and method for communicating between an intelligent agent and client computer process using disguised messages illustrates an agent for the communication with a client and which uses a selector known by both parties to generate and interpret messages and thereby to effectively disguise confidential information transmitted in the message from third parties.

International application number WO 98/43146 assigned to IBM Corp., and entitled Intelligent agent with negotiation capability and method of negotiation therewith Is another example of an improvement brought to a so called intelligent agent.

In addition to the development of agents, the use of one or more profile files located within the user's machine, is clearly a very promising field of development. A profile file is usually more easily updated since the customer feels more concerned about the information that he loads into his own profile file(s). Further this Information continuously remains under his/her own control. When the customer permits it, the use of the information loaded into that or those profiles shows to be a material of the highest interest for service providers since it clearly enhances the personalization and the possibilities of negotiation with the customer. Practically, the profile files can be used by product/service providers who wish to propose an offer well tailored to the customer's needs.

Unpublished European patent application n° 0041004.6 entitled "process and apparatus for allowing transaction between an user and a remote server" by G. Brebner, filed on 21 Jan. 2000 and assigned to the Assignee of the present application, shows a profile file which is used for improving the possibilities of negotiation between a customer and a product or accessories provider. Basically, there is disclosed a process which receives an abstract request expressed by the user. The request is subject to contextual analysis for the purpose of preparing n aggregate request based on the abstract formulation of the client, which can then be completed with additional technical information which is extracted from a local profile. Since the products/service providers are automatically given direct access to the internal configuration of the machine, of which the user may even not be aware, they can propose offers which are correctly tailored to the users, even when those are not versed in the field of computers.

While the use of one or more profiles substantially enhances the personalization of the access to the web, as well as the possibilities of negotiation between the customer and the service/product providers, it can be seen that the customers feel more and more concerned with the question of the privacy of their private data, and the risk of any misuse of that information.

Mechanisms have been developed for minimizing the exposure of sensitive data on the Internet and particularly the highly confidential information that is contained within such profile files. Unpublished European patent application n° 00410005.3 (HP50001003) entitled "method for a personalized access to the Internet network" by G. Brebner et al, filed on 21 Jan. 2000 and also assigned to the Assignee of the present application brings a first solution to the problem of privacy. There is disclosed a process, still based on an agent, which avoids the dissemination of the user's personal data over the web. For that purpose, an agent located on the user's machine generates a Hyper Text Markup Language (HTML). page for the user and which takes into account private data contained into at least one profile file. At different predetermined intervals, the Agent module polls one or more predetermined service provider(s), and downloads a file that simultaneously contains both data representative of products or services, and rules for stating the conditions for the attribution of the data. By comparing the rules with the private data contained within said at least one profile, a local data mining process is achieved and the Agent can construct a personalized HTML page which contains an offer well tailored to the customer's needs. This can be finally displayed into the web browser of the client machine Since the HTML page is locally generated with the private data that is contained In the profile(s), and which belongs to the user, the service provider does not need to create and maintain any kind of centralized database, and the user profile remains in the user's machine.

The present invention extends the possibilities of exploitation of the profile files, which substantially increases the security of the access to the important information therein contained.

SUMMARY OF THE INVENTION

It is an object of the present invention to enhance the flexibility and the use of profile files containing highly sensitive information, while ensuring a high degree of security in respect of that information.

This object is achieved by the present invention which provides a process for executing a downloadable service within the client machine which receives very restricted access rights to the user's profile file(s).

Basically, there is provided a process which involves the step of accessing a server on the Internet or a intranet network through a web browser which Is assigned a first port and socket for the communication with the web server. When the user requests the downloading of an executable service from a web server, the web browser launches confined run time environment which is assigned a second port and socket for receiving the downloadable service. The confined run time environment is arranged to provide restrictive access rights to at least one profile file(s), so that the executable service may only access the profile file(s) through the methods and access rights which are defined by the confined run time environment. This substantially minimize the risk of any misuse of the valuable information contained with the user's profile.

Preferably the confined run time environment corresponds to an extended sandbox in the context of the Java programming. The personal service is received under the form of set of data (remote information, sorting code, requested data) which reference is contained within an Hyper Text Mark-up Language (H.T.M.L.) page accessed by the web browser. The service is received in an archive file, such as a jar file for instance, which is signed and which contains a class structure of java code. The Java code may also be received from a File Transfer Protocol (FTP) server.

In one embodiment, the process validates the archive file and in accordance with the signature existing within the determined archive file, uses a predefined jar and secure class loader for embodying a specific corresponding sandbox associated to that class structure. Therefore there is achieved a direct association between the signature of the applet file and the java security mechanisms which will be used for executing the service.

Preferably, the predefined jar loader is used for controlling the access to at least one profile file so that the service which arrives within the extended sandbox and which is compiled in accordance with the predetermined jar loader receives a personalized access to said profile(s) file. There is therefore achieved a high control and security on the information belonging to the user.

More preferably, the predefined personalized sandbox is used for providing is methods allowing a selective access to some specific areas or sections of the profile file(s) which contains an hierarchical structure of data, user display, and remote communications. In one application, the profile file includes personal data belonging to the user, while an additional section comprises technical data concerning his/her computer.

When the signed archive file is received and opened with the corresponding jar loader, the latter implements methods, according the user policy, to the already contained classes for the purpose of personalizing the access rights to the profile. The Java service code can then be executed in its personalized environment and starts processing tasks, possibly on the personal data of the user. A local service can then be executed on the local machine with some of the user's private data. As soon as the result of the service is made available, the latter can be transmitted back to the web server for additional process and negotiation without requiring the exchange and transmission of the private data of the user loaded within the profile files.

In one embodiment, the service is used for executing a data mining process on the information loaded into the profile(s).

The process according to the invention increases the possibilities of personalization of the access for service providers since diffrent jar loaders may be used for different signatures and different service providers. Additionally, there is provided a wide range of new high added-value services for the customers.

Even in the case of one unique jar loader, the latter can be used to arrange a set of different access rights to some specific areas or sections of the profile(s).

A powerful downloadable service can be executed within the local machine of the customer while minimizing any risk of misuse or abuse of the user's private data. The validation process based on the signature and, additionally, the access of the profile through the restrictive access permissions arranged by the sandbox and the class loader substantially secures the use of the user's profile.

In one embodiment, when the archive file of the service is received within the extended sandbox, the service is being executed and initiates a processing task which may continue, even if the connection with the web server is being discontinued. When the task completes and the result is made available, the latter will be transmitted to the web server at the next dial-up and connection for the purpose of a further processing of the negotiation.

In some extent, there is achieved the concept of "consumable" service—requiring no installation process as for the other software packages—which can be downloaded in an archive file and received in a very personalized environment, with restrictive access to the profile file of the user. When the execution of the service completes, the useful result is provided to the user or to a web server and the service is discontinued. A wide range of applications and new added-value services can use the process for the benefit of the customers, such as travel or flight booking service, electronic business, data mining and book-keeping processing tasks.

DESCRIPTION OF THE DRAWINGS

Embodiments of the Invention will now be described by way of examples only, with reference to the accompanying drawings, wherein.

DESCRIPTION OF THE PREFERRED EMBODIMENTS OF THE INVENTION

As will be shown below, the negotiation process is handled by means of a temporary or consumable service which is launched within the existing confined run time environment and which receives some access rights to the user's profile. An example will be considered with a travel agency service which may take advantage of the useful and valuable information loaded within the user's profile file, such as his personal options, the number of children, etc.

The preferred embodiment will be described with a service which is downloaded under the form of a jar file contained within an Hyper Text Mark-up Language (H.T.M.L.) page.

Clearly, this is only an example of an implementation and other embodiments could be contemplated.

Figure 1:
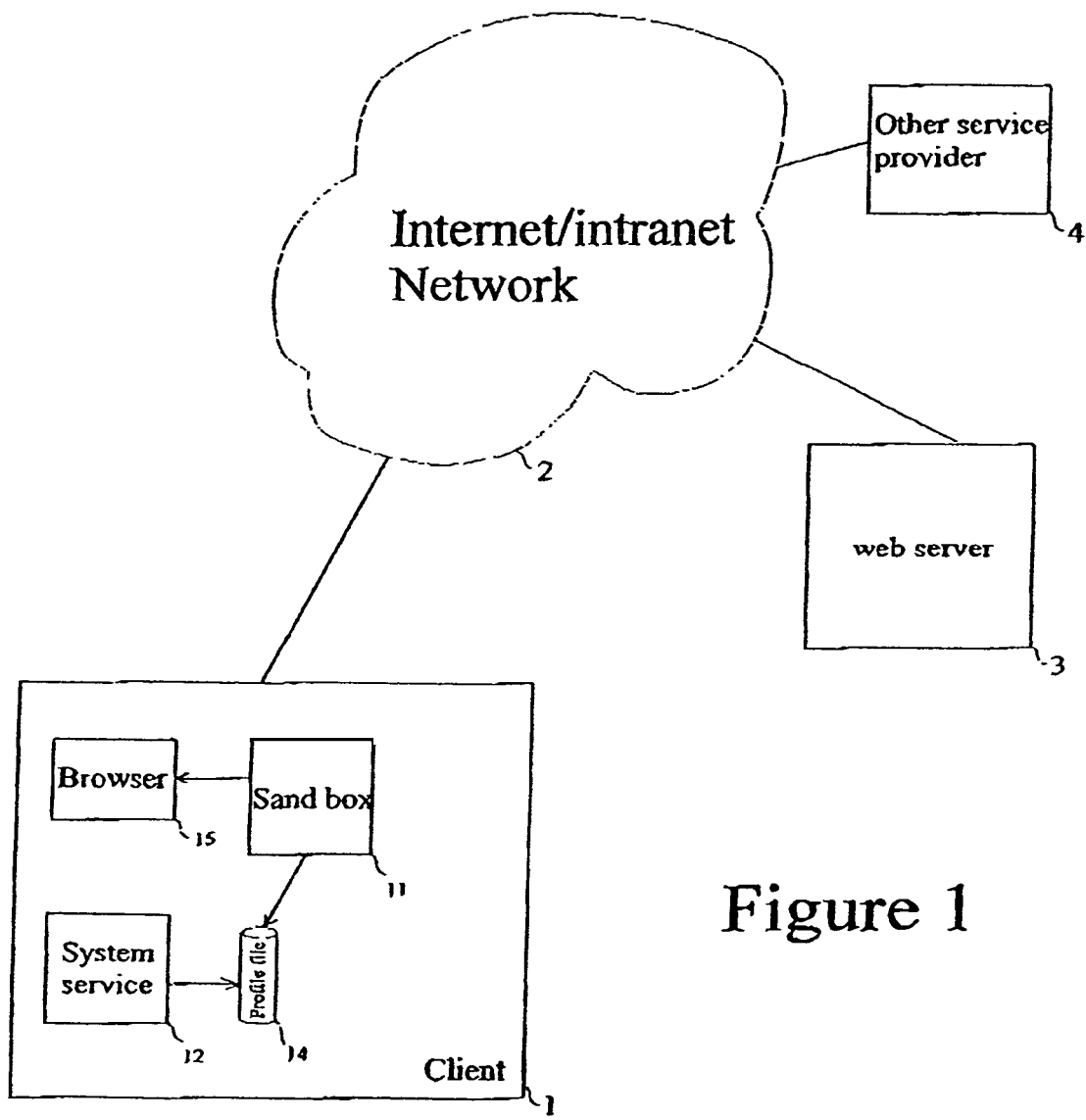
FIG. 1 illustrates the basic principle of the transmission of a downloadable service into a local client computer.

As shown in FIG. 1, a user's computer 1 is connected to a communication network 2, such as an Internet or Intranet network for instance. In this way, he may access to multiple different service servers, and particularly to an electronic service portal 3 which is prepared to accept and process communication as will be described hereinafter with details. A web server 4—for instance a travel agency portal—may be dedicated to receive air-flights booking or reservation commands.

The user's computer 1—or client—includes a web browser 15 which is, for instance, Internet Explorer 4 or 5 (manufactured by Microsoft Corp.) or Netscape Explorer (manufactured by Netscape Communications Corp. The web browser is used for accessing HTML pages located from web server 3 and 4 and, when appropriate, for downloading the applet therein included.

As known in the field of Java programming, the expression sandbox refers to a confined runtime environment. These are sometimes also called. rubber-walled "jail" environments and are notional spaces within a computer in which certain programs can run in isolation from the host system. This can also refer to the safe mode of the Java Virtual Machine which turns on when a Java applet is run inside a web browser. Such an environment can be used to run untrusted Java applets that are downloaded from the web. Practically, a sandbox is a set of limitations or restrictions which are imposed on untrusted applets and are designed to prevent those applets from acting so as to compromise the client system. This is done by disallowing access to certain APIs by means of security exceptions.

An extended sandbox 11 is launched when a service is to be received by the client machine, as will be described hereinafter with further details. The extended sandbox is arranged for organizing a restricted access to the user's profile file As known by the skilled man in java programming, the security is based on four distinctive elements forming the sandbox the Byte Code Verifier, the Secure Class loader, the Access Controller, and the Security Manager. Together, these four elements perform load and run time checks to restrict file system and network access, as well as access to browser internals. More information can be found on the Java Security Web Site which address is provided in http://www.rstcorp.com/java-security.html The profile file is used for gathering, when appropriate, the user's personal data (such as preferences and knowledge) possibly combined with technical information concerning the environment of the user's machine, user's comportments, habits and preferences. As most users are not versed within the field of computers, it can be advantageous to organize one particular section of the profile file with technical information which is automatically collected by system service 12 of FIG. 1 System service 12 is based on a so called sysinfo.exe executable file which extracts system information directly from the SMBIOS tables, or interrogates the Distributed Management Interface (DMI, or Windows Management Instrumentation (WMI) as known from Microsoft. As known by the skilled man, the DMI interface is an Application Programming Interface (API) that consists of a set of routines that are called for accessing the information stored within the BIOS layer. Basic Information relating to the DMI programming interface can be found at the address http://www.dmtf.org/spec/html. By using the DMI or WMI interfaces, or by accessing directly the SMBIOS level, the sysinfo.exe executable file accesses the different tables contained in the System Management BIOS (SMBIOS) for the purpose of reporting comprehensive information regarding the user's configuration, and required for completing a request for transaction. Such Information includes the type of processor, the type of chipset, the number of hard disk drives the particular graphic card being used, the serial number of the display, the reference of the operating system and so on. User related profile can be collected using explicit techniques such as specific forms, or using implicit techniques such as cookies, spyware, click stream tracking, or a mix of these techniques.

In one embodiment, the profile file(s) can be arranged in a hierarchical organization, with different sections containing information of different category. The profile file is embodied under the form of a known Extensible Mark-up Language (XML) standard which is defined by the World Wide Web Consortium (W3C) and which is associated to Document Type Definition (DTD) file.

In one embodiment, the profile may comply with the recommendations provided by the CPEX (Customer Profile EXchange) This consortium works to HP realize a specification in order to define a data model for profile information that relate customers of enterprises. The specification also defines metadata to associate privacy control on customers information and a protocol for query, deliver and update these information. CPEX refers to other standard such as XML, P3P, LDAP/DSML, AUO.

Figure 2:
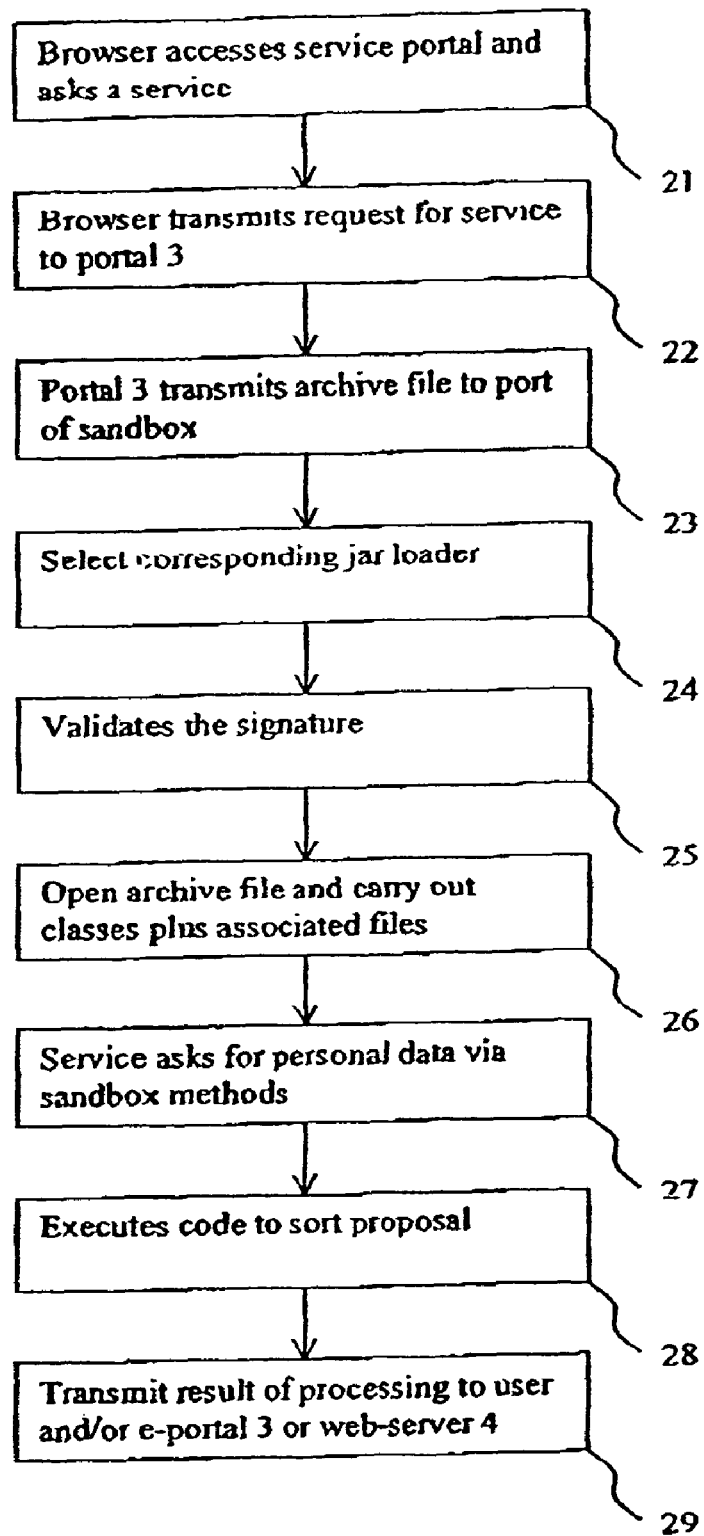
FIG. 2 is a flow chart illustrating the process which is executed when a service is downloaded, received and executed within the extended sandbox.

With respect to FIG. 2 there will now be discussed the basic process which is executed for launching the consumable or temporary service when the user is surfing over the Internet.

In a step 21, the user establishes a connection to the electronic service portal 3 by introducing the appropriate Uniform Resources Locator (U.R.L.) of the web portal, such as, for instance, http://www.hp.eservice.com. Clearly, the communication can take advantage of the wide generalization of the Internet. Is protocols, and in particular the Hyper Text Transfer Protocol (HTTP). In the preferred embodiment, the local agent issues a request for transaction which is embedded into a HTTP GET request which is recognized at every level, and particularly by every Proxy The particular format of the HTTP GET request is defined in the well-known rules laid down in the Request For Comments (RFC) 2.6.1.6, which are available at the following address http://www.w3.org/protocols.

The web portal receives the request and prepares the construction of an Hyper Text Markup Language (H.T.M.L.) page which is transmitted back to the users computer and pushed into his web browser 15. In one embodiment, the process may take advantage of the teaching of the above mentioned European patent application n° 0041004.6, which is herein incorporated by simple reference, for the purpose of completing the abstract user's request with some basic information extracted from the profile. In that situation, the user is allowed to enter only partial information—referred to in the following as an abstract request since it only contains some basic incomplete information—and process it for completing the transaction.

In step 22, the user selects a service that causes the transmission of a corresponding request to the service portal 3. In the preferred embodiment the service is downloaded under the form of a package file (such as a jar file). This download launches a specific sandbox which is arranged to communicate via a port and socket which may be different to that used for the normal HTTP connection by the browser 15. As known by the skilled man, the usual port is port 80 and the sandbox can conveniently be arranged to listen for communication on another available port.

In step 23, the web server responds by transmitting an archive file that is received by the extended sandbox on its dedicated port and socket. The archive file is a signed file, for instance jar file which contains a set of class structure corresponding to the java code classes of the service being desired. It is clear that the process is directly applicable to java code classes but should be understood as applicable for other types of data structures, such as agent technology.

In step 24, the corresponding jar loader is selected using the corresponding transmission port of the service portal 3. The jar loader starts with step 25, i.e. checking the signature and validates them in accordance with the known java security mechanisms. In the case where the signature is corrupted, the service code is discarded by the java security mechanisms. The processing of signatures and the security manager depends upon the particular web browser being used. Such mechanisms are well known by the skilled man and will not be further elaborated on. More information on java security mechanism may be found in the following references, *Java Security* from Scott OAKS, Edition O'Reilly and *Java Cryptography* from J. KNUDSEN, Ed. O'Reilly.

In step 25, the signature is used for selecting one particular secure class loader among a set of predefined class loaders, and permission in order to control and isolate the service application. The secure class loader is used for opening the jar archive file, for generating the classes of the java code. By choosing a selected class loader, the process causes a direct association of the security policy with the originator of the service being downloaded. It can be seen that the signature is used for checking the integrity of the file and, also, for choosing a particular security policy mechanism.

In step 26, the archive file (jar) is opened and the class loader that was selected in step 25 generates the set of classes contained within the service, and links interfaced methods to the corresponding implemented sandbox methods. Therefore, it can be seen that the conventional Application Programming Interface (API) which is used for generating the sandbox upon the reception of the set of java classes is modified for the purpose of processing the java classes coming from a determined service provider. Therefore, a set of selective and personalized permissions and access rights can be associated to some services received from some service providers. The set of permissions is used for providing a selective access to at least one profile file, for instance a profile containing user private data.

In step 27, the corresponding Java code is being compiled with the appropriate access rights to the user's profile. These rights allow or refuse the access for the missing data to personalize the service. Then, in step 28, the code used to sort the remote information is executed within the extended and personalized sandbox.

When the result of the process is available, it is transmitted back in step 29 to the user and/or web server 3 or to a different web service provider 4. The web service 3 or 4 can then prepare a well-tailored offered which will be transmitted back to the web browser 15 of the client.

It can be seen that a highly personalized transaction is achieved in a personalized and secured environment. The signature is used for validating the applet being downloaded and, additionally, servers for personalizing the access rights to be assigned to the applet. The access rights can be defined in a very flexible way, simply by introducing new java classes in the compile code by means of the predefined jar loader. Therefore, a given service for example, corresponding to a flight-booking service may be authorized to get access to the user's profile, and particularly to the private section summarizing the composition of the users family, the different options which are usually favored by the family etc ... On the other hand, the service will not be allowed to access other part of the profile relating to medical or professional sections.

The personalization is rendered very flexible since one single jar loader may provide precise and full control over the different branches and sections of the user's profile. The use of such a profile by web providers will significantly enhance the access to the Internet.

Figure 3:
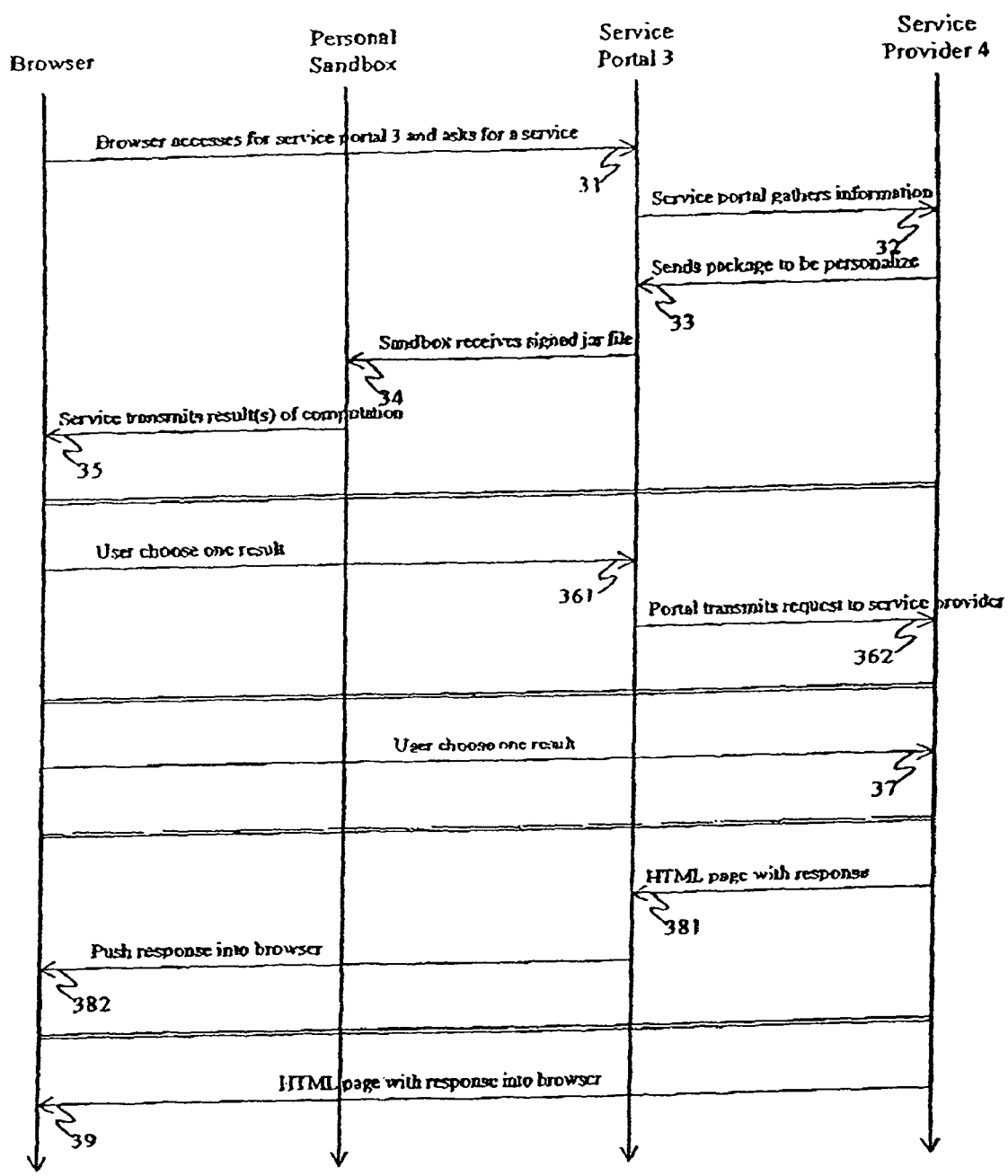
FIG. 3 is a flow chart illustrating the different messages being exchanged between the web browser, the extended sandbox and the web servers.

FIG. 3 illustrates the different messages which are exchanged by the different elements in the negotiation process. Upon request of the user, as referenced by arrow 31, the browser transmits a request to web server 3 for the purpose of downloading an appropriate archive file. The web server 3 gathers a set of information, illustrated by arrows 32 and 33, asking service provider throw the web. The web server 3 creates an archive file and transmits it to the user's extend d sandbox 11, as illustrated by arrow 34. The sandbox executes the downloaded service which access the private data loaded within the user's profile, and when the result is available. It is transferred to the user browser in order to wait his final choice as shown arrow 35. One time the user final choice done, the result can be transmitted either first to the service portal 3 (arrow 361), alternatively to another web server (not shown), next to the service provider 4 (arrow 362), either directly to the service provider (arrow 37). The communication with the service portal 3 and/or the service provider 4 is done if it is appropriate. The service provider can answer, if necessary (e.g. to confirm a booking), via an HTML page sent either first to the service portal 3 (arrow 381) next to the user's browser 15 (arrow 382), either directly to the user's browser 15 (arrow 39). In this confirmation phase, the service provider 4 can be useless, in this case arrows 362, 37, 381 and 39 are not used.

The exchange of messages described above shows how it is easy to personalize the communication between the user and one or more service provider, while securing the use of the private data loaded within the user's profile file.

In the following description, there will be described a specific structure of a profile file and the example of the access to that profile file.

The kind of access to a profile depends on the context of the use. Data are created, updated, deleted and consulted, according to a use. In this way, it is not always necessary to provide the all set of personal data to a user or a service. Contexts have to be created.

According to this, when a service requests for data in order to personalize itself, it has to link its requests to a context. For instance, a "travel booking service" can ask for number of children but a "grocery buying online service" does not need to ask such a question. Asking a credit card number is justified by a final booking phase but can be allowed for a simple data research. It is the aim of the profile access user's permissions to control, enable and disable the access to the user's personal data.

Figure 4:
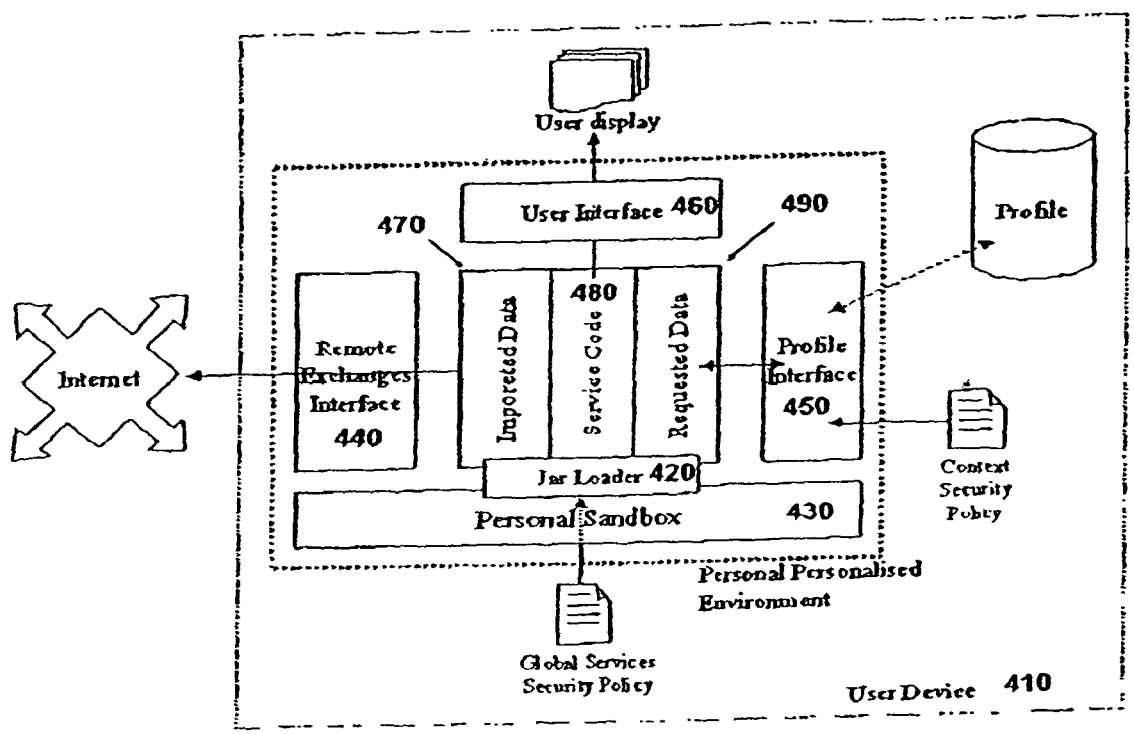
FIG. 4 illustrates the architecture of one preferred embodiment of a confined run time environment.

With respect to FIG. 4, there is shown a preferred embodiment of a user platform in a java environment. The Personal Personalized environment 410 comprises a jar loader 420 which is linked to the personal sandbox 430. Three Interfaces, namely a remote exchanges interface 440, a profile interface 450, and a user interface 460 are used for exchanging data with other parts of the system. In the jar file there are three types of data which are used for embodying the service: Imported Data 470; Service Code 480 and Requested Data 490. The imported data 470 are provided by the service providers and describes the offers which are available. The service code 480 describes how to match or personalize the specific offer made to the user, based or using the imported data filtered by elements taken from the user's profile, i.e. the Requested Data 490. In order to access the personal data stored in the user's profile, the Service has to access the Profile Interface 450 which implements the specific context security policy. This is achieved by using a set of signatures (not shown). In Requested Data 490, a method such as "ask for" will request a name in the given context, for instance "travel booking". In order to interact with the user, the service has to use a User interface 460 which implements the appropriate functionalities for the device. Clearly the complexity of the user interface depends upon the particular device being involved, for instance a Personal Digital Assistant (P.D.A.), a personal computer, a mobile telephone, or even an Internet watch.

In the particular case where some results of the execution of the service needs to be transmitted back to a service provider, the service communicates via the Remote Exchange Interface 440 which limits the communication and the kind of information which is reported back to the service provider. This is clearly an additional advantage since it; provides a high level of flexibility in the control of the data which is received and analyzed, including the full control on the use of the results of that analysis which is possibly reported back to the service provider.

Any type of service could take advantage of the architecture shown in FIG. 4. In the case of travel booking service, for instance, the process executes the steps which were explained in detail in reference with the general flow charts of FIG. 2 and 3. In the case of travel booking, the user accesses the web portal (step 21 of FIG. 2) of one travel service provider and requests the booking of a particular destination and date. The travel service provider then constructs a package to reply to the request which consists of offers appropriate to that request, code which, when executed, will personalize the choice and an indication of the data required from the user's profile. This is the archive file received by the user's device in the form of a jar archive file as illustrated in step 23 of FIG. 2.

The jar archive is loaded by the Jar Loader as shown in step 24 and isolated immediately. This is achieved by means of the Personal sandbox shown in FIG. 4. As known by the skilled man, the Personal sandbox uses the text file embodying the Global Services Security Policy. It should be noticed that, in the preferred embodiment, the particular GSSP which is used allows no access on the user's resources or communication with the service provider. This is clearly an advantage because the user keeps the control on the information which is likely to be reported back to the Service provider.

The signature is used to identify the origin of the service and to associate a dedicated security policy in accordance with the user's privacy policy. To achieve this, the profile interfaces gets the contents of a text file containing the Context Security Policy which closely depends on the particular service being considered.

According to this specific security policy, the service asks for the requested data which are stored within the profile. The profile interface, implementing the controlled methods to access the profile, passes or blocks the data access.

The service code is then executed, using the combination of imported data provided by the service provider—for instance the choice of a destination of the flight to London plus a departure time as well as additional data giving details of the offers matching the original request), and the data taken from the user's profile.

The description above illustrates with what ease the architecture shown in FIG. 4 permits to embody any kind of service for enhancing security in the user's profile. Clearly, the architecture could even be used for embodying an authentication service arranged to cooperate with a smart card interface so as to permit validation of a service in accordance with the code typed by the user. Because only the service is being transmitted over the Internet network the security of the personal data belonging to the user is substantially increased.

Although the invention has been described by way of example and with reference to particular embodiments, it is to be understood that modifications and/or improvements may be made without departing from the scope of the appended claims.

Where in the foregoing description reference has been made to integers or elements having known equivalents, then such equivalents are herein incorporated as if individually set forth.

The invention claimed is:

1. A process for executing a downloadable service with specific access rights to at least one profile file in a user's computer, said computer comprising a web browser communication to an internet or intranet via a first communication port and socket, said process comprising:
    arranging a confined run time environment which is assigned a second communication port and socket and provided with restricted access to said at least one profile file that is located on the user's computer;
    downloading said service through said second communication port so that it is received by said confined run time environment; and
    executing said service within said confined run time environment whereby said service is given restricted access to said at least one profile file.

2. The process according to claim 1 wherein said confined run time environment is an extended sandbox having restrictive access to said at least one profile file.

3. The process according to claim 2 wherein the service is downloaded under the form of a set of java code containing classes structure packaged within a signed archive file; the service comprising remote Internet data, a list of requested data that are needed to personalise the service, and code to sort remote internet data using request accessible data.

4. The process according to claim 1 wherein said downloadable service is an authentication service cooperating with a master card.

5. A process for executing a downloadable service with specific access rights to at least one profile file in a user's computer, said computer comprising a web browser communication to the internet or intranet via a first communication port and socket, said process comprising:
    arranging a confined run time environment in said user's computer, said confined run time environment being assigned a second communication port and socket and provided with restricted access to said at least one profile file that is located on the user's computer;
    downloading said service through said second communication port so that it is received by said confined run time environment; and
    executing said service within said confined run time environment whereby said service is given restricted access to said at least one profile file.

* * * * *

UNITED STATES PATENT AND TRADEMARK OFFICE
CERTIFICATE OF CORRECTION

PATENT NO. : 8,275,791 B2 Page 1 of 1
APPLICATION NO. : 10/616582
DATED : September 25, 2012
INVENTOR(S) : Eric Raffaele et al.

It is certified that error appears in the above-identified patent and that said Letters Patent is hereby corrected as shown below:

In column 10, line 45, in Claim 4, delete "master" and insert -- smart --, therefor.

Signed and Sealed this
Twelfth Day of February, 2013

Teresa Stanek Rea
*Acting Director of the United States Patent and Trademark Office*